Jan. 28, 1958 J. H. S. GARDNER 2,821,445
PISTONS OF COMPRESSION IGNITION ENGINES
Filed June 2, 1955

Inventor
J. H. S. Gardner

United States Patent Office 2,821,445
Patented Jan. 28, 1958

2,821,445

PISTONS OF COMPRESSION IGNITION ENGINES

Joseph Hugh Stott Gardner, Patricroft, near Manchester, England, assignor to L. Gardner & Sons Limited, Patricroft, near Manchester, England, a British company Application June 2, 1955, Serial No. 512,840

Claims priority, application Great Britain July 22, 1954

2 Claims. (Cl. 309—10)

This invention relates to the pistons of compression ignition engines and is particularly concerned with a type of piston construction in which pressure is transmitted from the piston crown to the gudgeon pin by two vertical walls which are straight where they extend across the interior of the piston at the opposite sides of the gudgeon pin bearing in the connecting rod eye, the said walls coming close together as permitted by the length of said bearing. The piston may have a full cylindrical or part cylindrical skirt below the gudgeon pin. The width of the piston (in the plane of the gudgeon pin axis) where the said walls are situated beneath the piston ring grooves is less than the diameter of the piston at said grooves so that the heat flow paths from the piston crown tend to keep clear of the piston rings.

The object of the present invention is to provide improved means for facilitating the transmission of heat from the lower portion of the piston surrounding the gudgeon pin and gudgeon pin bearing in the connecting rod to the relatively cool cylinder walls and to the air and oil within the engine.

In accordance with the present invention, I provide web like extensions of the vertical walls before referred to which transmit pressure from the piston crown to the gudgeon pin, such extensions reaching down below the gudgeon pin bearings and merging at opposite sides into the cylindrical portion of the piston skirt below the gudgeon pin.

Figure 1:
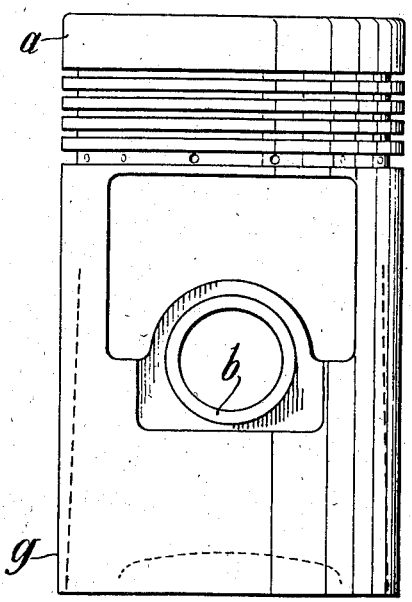
Figure 2:
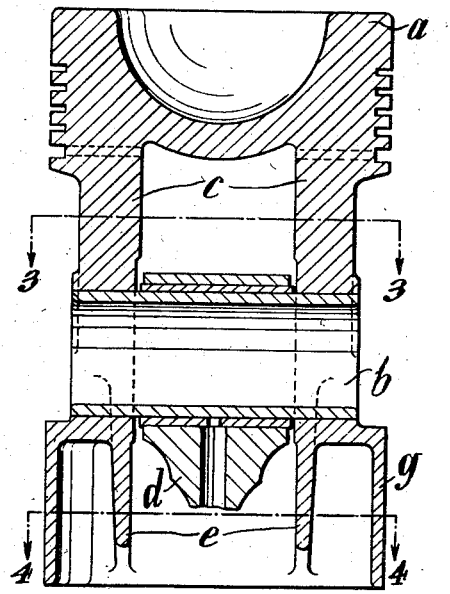
Figure 3:
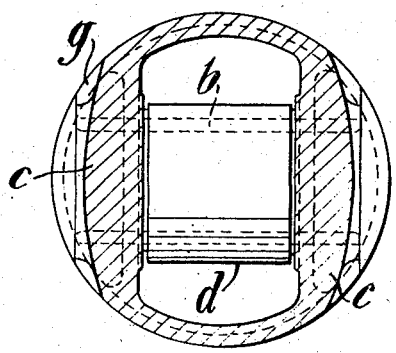
Figure 4:
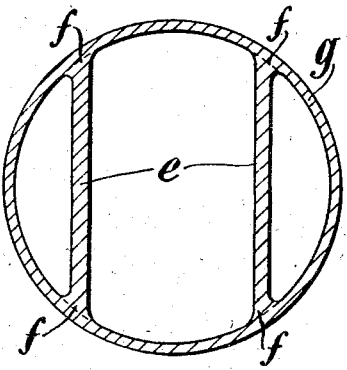

Referring to the accompanying explanatory drawings:

Figure 1 is an elevation, Figure 2 a sectional elevation at right angles to the Figure 1 view, Figure 3 a sectional plan view on the line 3—3 of Figure 2 and Figure 4 a sectional plan view on the line 4—4 of Figure 2 showing a piston of a compression ignition engine constructed in one convenient form in accordance with this invention.

The piston shown is so constructed that the transmission of pressure from the piston crown $a$ to the gudgeon pin $b$ is effected through two straight vertical walls $c$ extending across the piston at the opposite sides of the gudgeon pin bearing in the eye of the connecting rod $d$, the said walls $c$ coming as close together as permitted by the length of said bearing.

In accordance with the present invention, there are web like extensions $e$ of the vertical walls $c$, such extensions $e$ coming below the gudgeon pin bearings and merging at $f$ at their opposite sides into the cylindrical portion $g$ of the piston skirt below the gudgeon pin.

Such web-like extensions $e$ may each have a thickness of from one-two hundred and twenty fifth to one fortieth of the outside diameter of the piston and may have a minimum length below the gudgeon pin axis of three tenths of the outside diameter of the piston. The webs may taper downwards as shown for convenience in manufacture.

My improvement, by reason of the disposition of the metal in the web-like extensions, secures improved distribution of pressure upon the surface of the piston sliding within and upon the cylinder bore as the angle of the connecting rod changes during the reciprocation of the piston.

What I claim is:

1. A piston assembly for a compression ignition engine comprising a crown, a skirt, a gudgeon pin intermediate the crown and the skirt, bosses for the gudgeon pin, two vertical walls between the crown and the gudgeon pin with the walls being straight where the same extend across the interior of the piston assembly at the opposite sides of the gudgeon pin bearing with the pressure transmitted from the crown to the gudgeon pin through such vertical walls, said vertical walls being substantially the same width as that of the bosses for the gudgeon pin, and a web-like extension on each vertical wall extending downwardly below the gudgeon pin bosses with such web-like extensions extending across the skirt in parallel straight lines and the terminal ends of the extensions merging with the skirt.

2. A piston assembly as defined in claim 1 wherein each extension is of a thickness of from one-two hundred and twenty fifth to one fortieth of the outer diameter of the piston and of a minimum length below the gudgeon pin axis of three tenths of the outer diameter of the piston.

References Cited in the file of this patent

UNITED STATES PATENTS

| 1,057,063 | Knudson | Mar. 25, 1913 |
| 1,768,815 | Beckmann | July 1, 1930 |
| 1,768,816 | Beckmann | July 1, 1930 |
| 2,044,854 | Long | June 23, 1936 |
| 2,313,202 | Korytko | Mar. 9, 1943 |

FOREIGN PATENTS

| 428,051 | Great Britain | May 7, 1935 |
| 564,660 | Great Britain | Oct. 6, 1944 |
| 757,673 | France | Oct. 16, 1933 |